Oct. 8, 1963     L. A. KAMENTSKY     3,106,699
SPATIALLY ORIENTED DATA PROCESSING APPARATUS
Filed Oct. 7, 1958                                                                   8 Sheets-Sheet 1
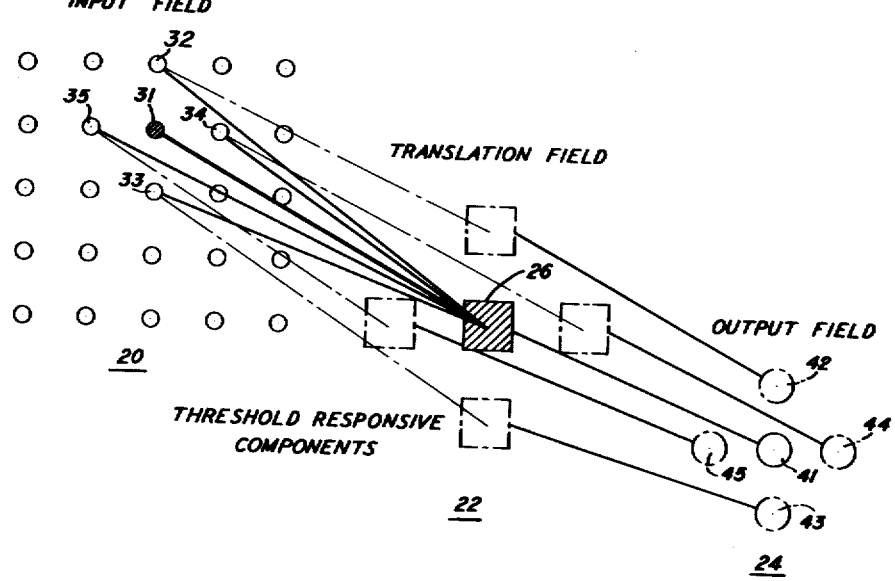
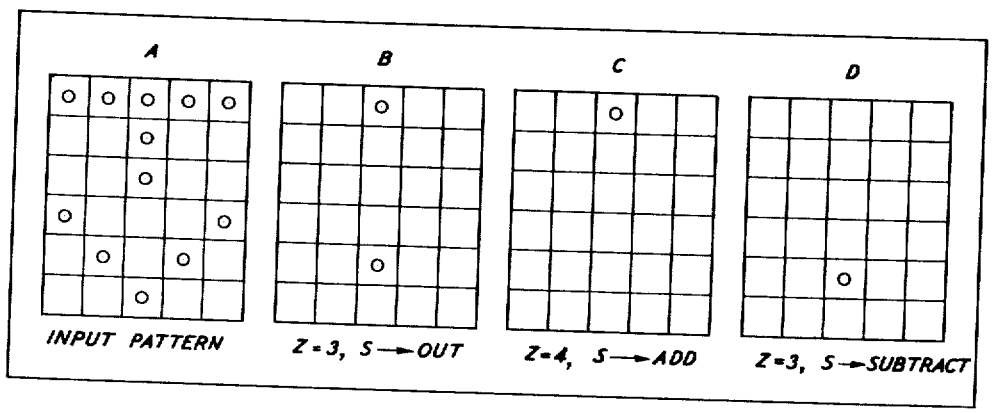
INVENTOR
L. A. KAMENTSKY
BY
ATTORNEY

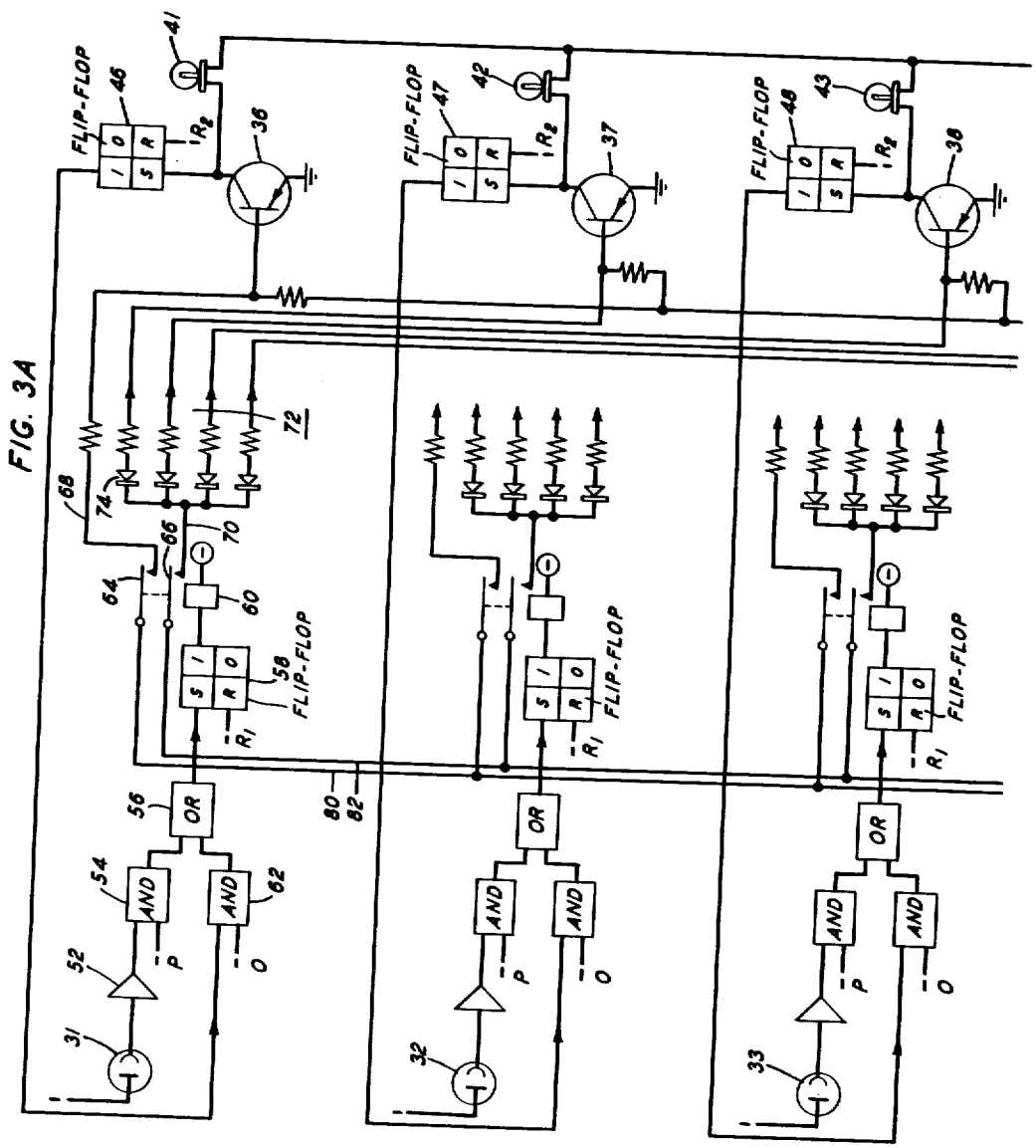

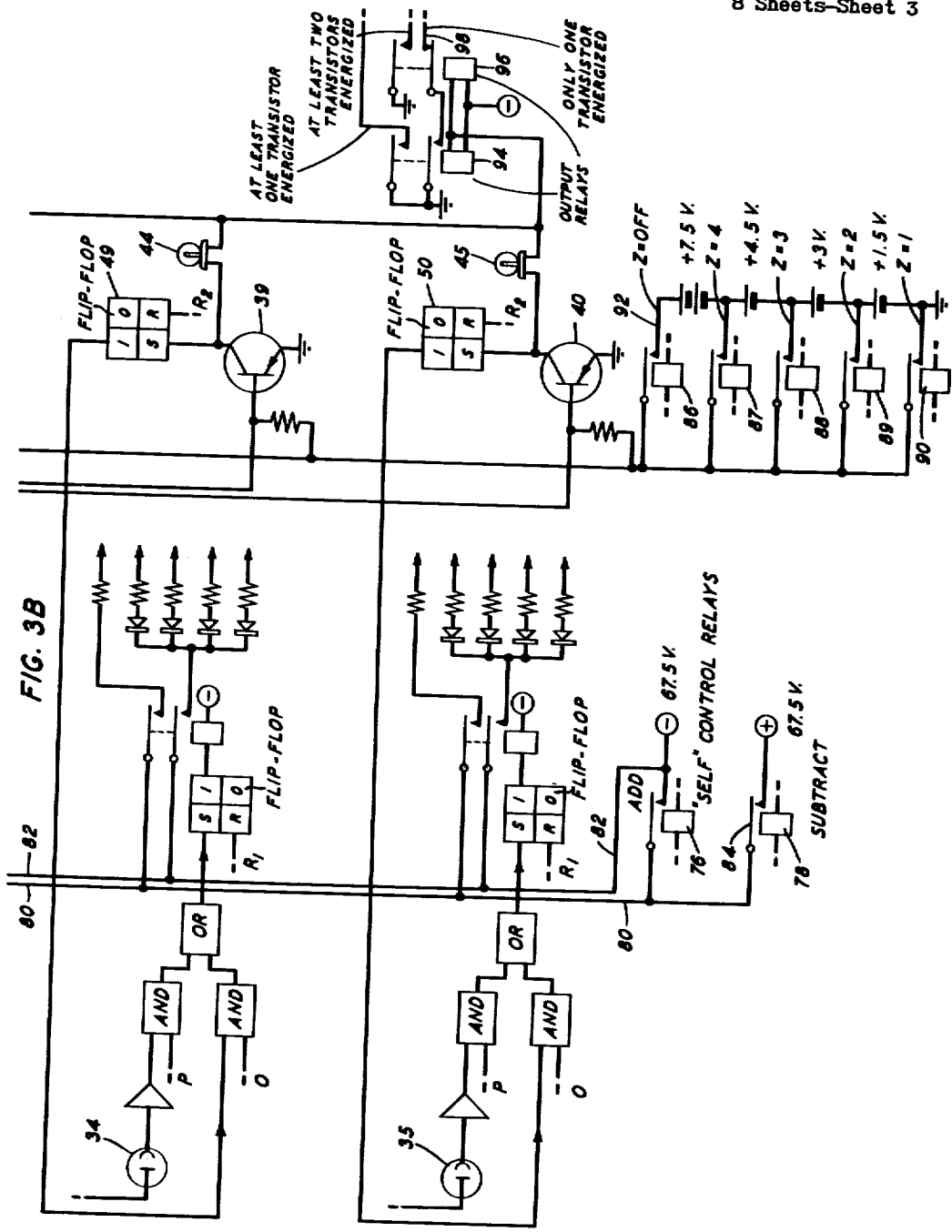

Oct. 8, 1963  L. A. KAMENTSKY  3,106,699
SPATIALLY ORIENTED DATA PROCESSING APPARATUS
Filed Oct. 7, 1958  8 Sheets-Sheet 4

INVENTOR
L. A. KAMENTSKY
BY Alan C. Rose
ATTORNEY

Oct. 8, 1963     L. A. KAMENTSKY     3,106,699
SPATIALLY ORIENTED DATA PROCESSING APPARATUS
Filed Oct. 7, 1958     8 Sheets-Sheet 5

*FIG. 5*

INVENTOR
L. A. KAMENTSKY
ATTORNEY

Oct. 8, 1963 L. A. KAMENTSKY 3,106,699
SPATIALLY ORIENTED DATA PROCESSING APPARATUS
Filed Oct. 7, 1958 8 Sheets-Sheet 6

INVENTOR
L. A. KAMENTSKY
BY Alan C. Rose
ATTORNEY

Oct. 8, 1963     L. A. KAMENTSKY     3,106,699
SPATIALLY ORIENTED DATA PROCESSING APPARATUS
Filed Oct. 7, 1958     8 Sheets-Sheet 8
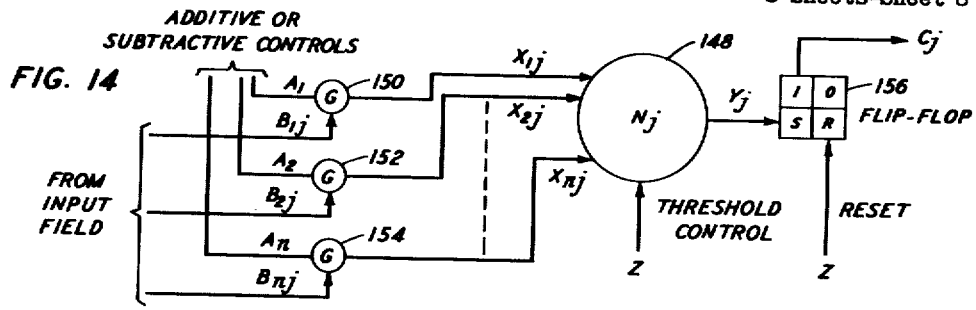
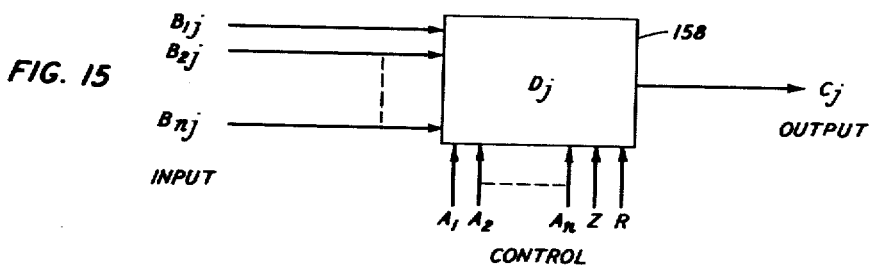
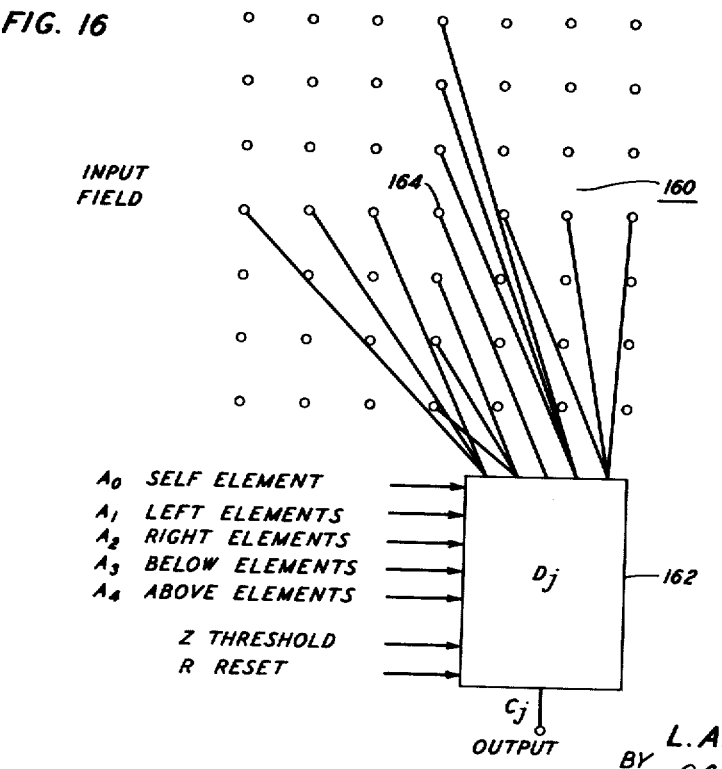
INVENTOR
L. A. KAMENTSKY
BY Alan C. Rose
ATTORNEY

United States Patent Office 3,106,699
Patented Oct. 8, 1963

3,106,699
SPATIALLY ORIENTED DATA PROCESSING APPARATUS

Louis A. Kamentsky, Plainfield, N.J., assignor to Bell Telephone Laboratories, Incorporated, New York, N.Y., a corporation of New York
Filed Oct. 7, 1958, Ser. No. 765,911
1 Claim. (Cl. 340—172.5)

This invention relates to data processing apparatus and more particularly to parallel data processing systems for operating simultaneously on large amounts of related input information.

Digital computing and data processing apparatus characteristically operate on input information on a digit-by-digit, or "bit-by-bit" basis. Although some computers have parallel type arithmetic units which operate on all of the digits of a single number simultaneously, the extent of the parallel action is normally just sufficient to perform the usual "bit-by-bit" computing operations at a slightly higher rate. Certain types of problems in which large quantities of related information must be correlated are not readily adapted to solution by conventional digital computers. "Spatial" problems such as chess playing and pattern recognition are typical of this type of problem. In these areas, present day digital computers have not been able to match the performance of their designers.

In a related patent application of S. H. Unger, Serial No. 730,856, filed April 25, 1958, a distributed data processing apparatus is disclosed in which input digital fields are processed by an array of translation modules to produce a modified output field. The system described in the Unger application has sophisticated capabilities and is relatively complex. In order to accomplish the desired functions, the individual modules in the translation array involve a considerable amount of logic and storage circuitry.

Accordingly, one object of the present invention is the improvement and simplification of data processing apparatus for pattern recognition and other "spatial problems."

In accordance with the present invention, it has been discovered that the use of threshold-responsive elements in a field translation array greatly simplifies the required computer structure for many types of field transformation problems. Flexibility is provided by control circuits which vary the threshold level of the individual translation devices. In one embodiment of my invention, the array of input devices has a one-to-one correspondence with the array of translation devices. Each input device may, for example, be connected to its corresponding translation device and also to the neighboring translation devices. Now, for example, by a proper adjustment of the threshold level, an isolated white spot in a black area in the input pattern may be converted to a black spot in the output field, thereby eliminating the undesired white point in the black field. Various other controls and adjustments may also be provided. For example, the effect of an input signal from an input device to its corresponding translation device may be made additive or substractive with respect to the input signals from neighboring input devices. In addition, output fields from the array of translation devices may be supplied to the input of the translation array for further modification.

In accordance with one feature of the invention, a spatially oriented data processing apparatus includes an array of translation modules, each of which includes a threshold-responsive component. A corresponding array of individual sources of input information has connections to the translation components from each source of input information to the corresponding translation component and its neighboring translation components.

In accordance with another feature of the invention, the data processing apparatus of the preceding paragraph may be provided with a central control circuit for varying the threshold voltage of the translation components. The central control circuit may also include arrangements for applying output fields from the translation array to its input and for applying other control signals to the individual translation components.

These and other objects and features of this invention will be better understood upon consideration of the following detailed description and the accompanying drawing, in which:

FIG. 1 is a diagrammatic showing of a data processing system in accordance with the present invention showing the input field, the translation field, and the output field;

FIG. 2 shows the results of several pattern translation operations which may be performed by the proposed data processing system;

Figure 3C:
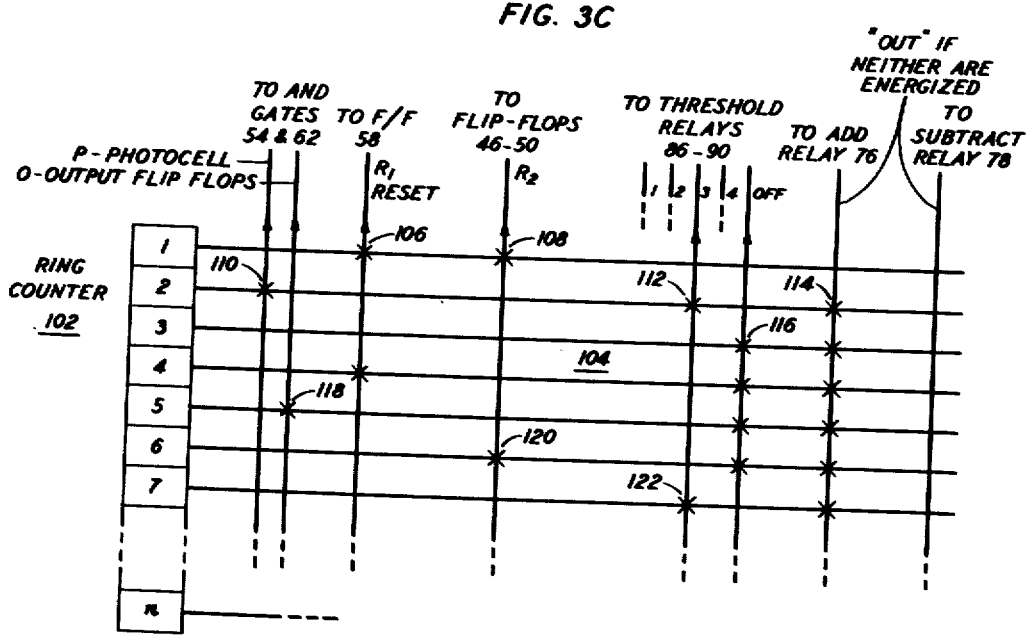
Figure 4:
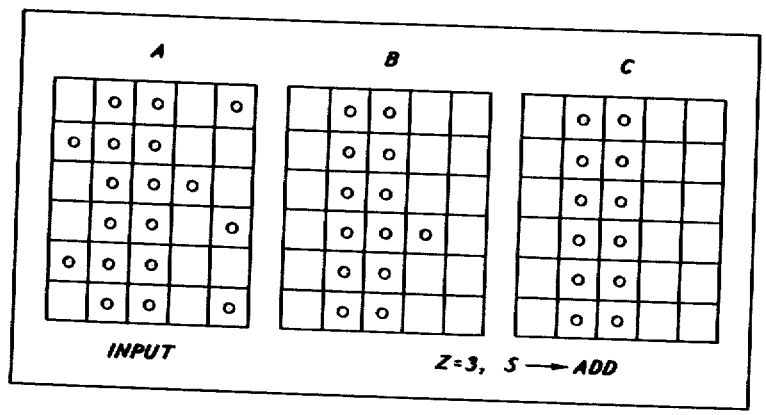
Figure 12:
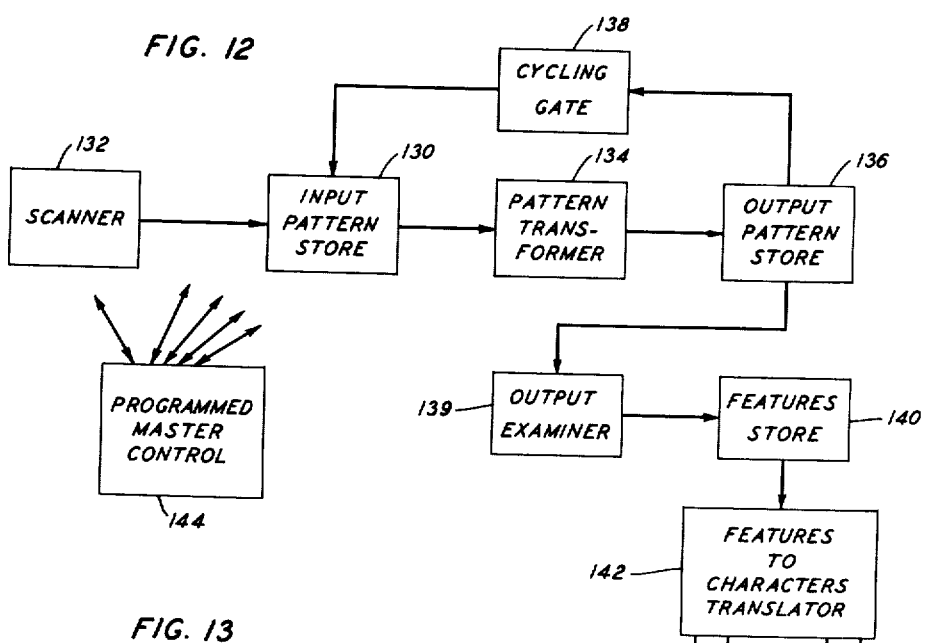
Figure 13:
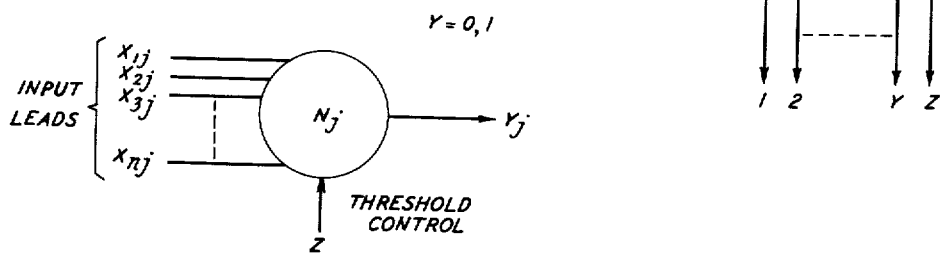

FIGS. 3A, 3B and 3C together constitute a circuit diagram of one illustrative embodiment of the present invention;

FIG. 4 is a set of diagrams representing successive transformations for noise reduction;

FIG. 5 shows input and transformation patterns for the apparatus of FIG. 3 with various control settings;

FIGS. 6 through 11 show various transformation fields based on indicated input fields and include various picture processing operations;

FIG. 12 is a block diagram of data processing apparatus designed to recognize alphabetical or numerical characters or other patterns through successive transformations;

FIG. 13 is a diagrammatic representation of one threshold-responsive element which is suitable for use in translation arrays such as that shown in FIGS. 3A and 3B;

FIGS. 14 and 15 are additional diagrammatic representations of a threshold-responsive element and its immediately associated circuits; and FIG. 16 represents an alternative embodiment of the invention which performs an operation which corresponds generally to a scanning technique.

In FIG. 1, the input field 20 may, for example, include an array of individual photocells. The transformation field 22 corresponds generally in extent to the input field 20. However, in FIG. 1, only five of the threshold-responsive components in the translation array are shown.

In the illustrative embodiment of my invention shown in FIG. 1, each of the threshold-responsive devices in the translation field has a direct connection to its corresponding input device. The component 26 in the center of the five elements of the indicated translation field is shown connected to its corresponding input device 31 by a heavy line. These corresponding elements in the two fields are both shown shaded. The threshold device 26 in the translation field is also connected to receive signals from the four input devices which adjoin its corresponding input device 31. In a similar manner, each threshold-responsive element in the field 22 is connected to receive signals from its corresponding input device and the neighboring input devices.

The output field 24 includes at least one output component for each translation component but is also shown as including only five components. The states of the components in the output field represent the states of the threshold-responsive components in the transformation field. The output field may include individual lamps 41, 42, 43, 44, and 45 and/or suitable individual storage elements.

The threshold-responsive components in the translation field 22 are subject to various controls. One of these controls determines the threshold level at which the components change state. Thus, for example, each of the translation devices in the array 22 of FIG. 1 is coupled to five input devices in the field 20. With a threshold setting of 2, the energization of two of the five input devices to which a translation component is connected is sufficient to energize the translation component.

Control arrangements are also provided in the connections between the input field and the transformation field for reversing or omitting the signal to a threshold-responsive device from its corresponding input device. Thus, each of the threshold-responsive components in the translation or transformation field may have one connection directly from its corresponding input device and four additional connections from neighboring input devices. The control signal may be applied so that the signal increment from the directly connected input device is additive with respect to the signals from the four neighboring input devices. With another control signal, the signal increment from the directly connected input device may be applied to the translation components subtractively with respect to increments from neighboring input devices. Alternatively, the direct connection from all of the input devices to their corresponding threshold-responsive components may be opened. Thus, the direct or "self" connection between each input device and its corresponding translation device may be either additive, subtractive, or open with regard to the increments supplied to a translation device from the other input devices.

The field patterns of FIG. 2 include an input pattern A and three translation patterns B, C, and D. It may be noted that the input pattern A includes symbols corresponding to a "T" and to a "V." With the threshold settings Z and the self or direct settings S set to the values indicated below each of the translation patterns B, C, and D in FIG. 2, the indicated translation patterns are obtained. Thus, for example, with a setting of the threshold control Z equal to three and with the direct connection open as indicated by "S" set to "Out," the pattern of FIG. 2B is obtained. This may readily be verified by noting that the indicated dots are the only points in the translation array having three neighboring input devices which are energized. In this regard, it should be particularly noted that points spaced from one another by a diagonal are not considered to be neighboring cells. In a similar manner, the translation patterns C and D show control settings which selectively identify the T and the V patterns.

In the foregoing discussions of FIGS. 1 and 2, the general nature of the data processing apparatus of the present invention has been broadly described, and one representative picture processing operation has been discussed. The circuit details of one implementation of the present invention will now be considered.

The circuit of FIGS. 3A, 3B, and 3C includes several representative input devices 31 through 35 and a corresponding group of threshold-responsive translation modules which include the transistors 36 through 40. Thus, for example, the threshold-responsive device 26 of FIG. 1 finds its counterpart in FIG. 3A in the circuitry including transistor 36 and associated resistors, diodes, and other control and input connections. The state of the translation array including transistors 36 through 40 is indicated by the state of lamps 41 through 45 and also controls the state of the bistable multivibrators or flip-flops 46 through 50. Each transistor and its corresponding flip-flop, such as the pair of components 36, 46, may be termed a threshold-responsive register. For the purposes of the circuit of FIG. 3A, it is assumed that the transistor 36 in the translation array corresponds to the input device 31. In addition, the four input devices 32 through 35 are the direct neighbors of input device 31. Similarly, the four transistors 37 through 40 are the immediate neighbors of the transistor 36 in the transformation array.

The input circuit for applying signals from the photocell 31 to the translation array 36 through 40 includes the amplifier 52, the AND circuit 54, the OR circuit 56, the storage register 58, and the relay 60. The AND circuit 62, which is connected to one input lead of OR circuit 56, is provided for gating signals from the output multivibrator 46 to the input of the translation array. The energization of the relay 60 is controlled by flip-flop 58. When the flip-flop is set to the "1" state, the relay 60 is energized and contacts 64 and 66 are closed. Thus, when it is desired to read the state of the input device 31, a signal P is applied to the enabling input of AND circuit 54. This signal is in turn gated through the OR circuit 56 to set shift register 58 and enable the relay 60. When contacts 64 and 66 are closed, appropriate signals are applied through leads 68 and 70 to the transistors 36 through 40 of the translation array.

When signals from the output registers 46 through 50 are to be applied to the translation array, the control lead designated "0" at the input of AND unit 62 is enabled, and the flip-flop 58 assumes the state of flip-flop 46. If flip-flop 58 is energized, appropriate signals are applied to the translation array through contacts 64 and 66. The summing resistors 72 and sneak path prevention diodes 74 are connected between the input contacts 64 and 66 and the translation array. The remaining input devices 32 through 35 have similar connections to the translation array. In each case, the input devices have one direct input to the corresponding translation device, and additional input leads to the neighboring translation devices. Accordingly, these other circuits will not be considered in detail.

As mentioned above, the transistor 36 in the translation array corresponds to input device 31 in the input field. In addition, the transistors 37 through 40 are the neighboring threshold components in the translation array. Accordingly, input signals from input device 31 are applied through contacts 66 and the summing resistors to all of transistors 37 through 40. These transistors switch from the cut-off state to the saturated state when the input voltage goes negative. The negative increments of voltage applied to each transistor by its input set of resistors must overcome the normal positive bias of the transistor to switch the transistor to the saturated state. The variable bias level determines the threshold of each transistor as discussed below. When a transistor is energized, its collector drops to ground potential, and provides a triggering signal to the associated output flip-flop.

The add and subtract control circuits for the direct connections between corresponding input devices and translation devices will now be considered in somewhat greater detail. The control of the direct connections is accomplished through the relays 76 and 78 (FIG. 3B). When relay 76 is enable, the bus 80 is connected to the same negative potential which normally supplies the bus 82. However, when relay 78 is energized, switch 84 connects the bus 80 to a positive potential source so that the direct connection signals oppose those provided on lead 82 to the neighboring threshold devices. When neither relay 76 nor relay 78 is energized, the direct connection provides no increment of current. This corresponds to the "out" or "omit" state discussed above for the direct or self connection.

The threshold level of the transistors 36 through 40 is controlled by relays 86 through 90. When relay 90 is energized corresponding to $Z=1$, any single input signal will enable one of the translation threshold devices. However, when $Z=2$, 3 or 4, a corresponding number of input signals must be provided in order to actuate a given translation component. When Z is set equal to "off," however, none of the translation devices are operative because of the high positive bias supplied by lead 92.

It is frequently desirably to determine when one and only one of the transistors in the translation array is energized. A suitable relay circuit including the relays 94 and 96 is provided for this purpose. The relay 94 is adjusted so that it operates when one or more transistors are energized. The relay 96 is arranged to operate when two or more of the transistors are energized. Accordingly, a ground signal will appear on output lead 98 only when relay 94 is operated and when relay 96 is not operated. This produces the desired output signal when one and only one of the transistors is energized. Additional simple "make" contacts associated with relays 96 and 98 provide output signals indicating (1) that at least one transistor is energized, and (2) that at least two transistors are energized. The usefulness of the three output leads is obvious from a reconsideration of the transformation patterns of FIG. 2, for example. Thus, if it is necessary to determine if a single input pattern is a "T" or a "V," the energization of any output lead under the conditions shown under pattern C of FIG. 2 would indicate that the pattern is a "T."

A simple control circuit for the arrangements of FIGS. 3A and 3B is shown in FIG. 3C. The circuit of FIG. 3C includes the ring counter 102 for defining successive program steps and a program matrix 104. In the matrix 104, the horizontal leads correspond to successive program steps and the vertical leads are connected to circuit elements of FIGS. 3A and 3B which require control signals. Interconnections between the horizontal program step leads and the vertical control leads are shown by X's in FIG. 3C. Such connections are normally made by diodes to avoid sneak paths, and suitable known arrangements are provided for bridging a diode between horizontal and vertical leads at any crosspoint. Signals from the individual steps of the ring counter 102 may be employed directly to provide control signals; however, where additional power is required as for large arrays, the signals from the ring counter may be employed to gate powerful signals to the necessary control points.

Before considering the specific connections set up in the circuit of FIG. 3C, attention is directed to FIG. 4. In FIG. 4, noise reduction is accomplished through successive transformations which change the input pattern A to pattern B of FIG. 4 and then to pattern C. In FIG. 4, the same control settings shown beneath patterns B and C are used for both transformations.

The apparent digression to the pattern of FIG. 4 is designed to provide a background for the specific program set up in FIG. 3C. More particularly, the program of FIG. 3C is designed to implement the noise reduction transformation series shown diagrammatically in FIG. 4.

With reference to FIG. 3C, the two connections 106 and 108 to the first level of ring counter 102 are designed to reset the input flip-flops including flip-flop 58 and the output flip-flops including circuit 46 in FIGS. 3A and 3B. On the second step of ring counter 102, the input from the photocells is sampled by the signal supplied by the connection designated 110. Input flip-flops such as circuit 58 then assume the state of their associated input photocells. Connections 112 and 114 set the threshold level at 3 and provide an "add" self connection, respectively. It may be noted that these correspond to the control settings included in FIG. 4, and involve the energization of relays 76 and 88 in FIG. 3B. On the third step of ring counter 102, the threshold level is set to "off" by connection 116. Under these circumstances, relay 86 in FIG. 3B is operated. In addition, it may be noted that the self connection remains in the "add" state for the remaining steps of the program. On the fourth step of the ring counter 102, the input multivibrators including circuit 58 of FIG. 3A are reset. Connection 118 to level 5 of the ring counter couples the signals from the array of output flip-flops including circuit 46 to the array of input flip-flops including circuit 58. In this regard it may be noted that the first pair of vertical leads in FIG. 3C provide the "P" and "O" signals for AND circuits 54 and 62 of FIGS. 3A and 3B. Other connections to level 5 include those required for maintaining the threshold setting at "off" and the self connection in the "add" state. Now that the output field is registered in the input array of flip-flops, step 6 provides an $R_2$ signal through connection 120 to reset the output flip-flops 46 through 50. In step 7, the threshold level is reduced to 3 by connection 122 to complete the noise reduction program.

In FIG. 3C, one program has been set up in terms of successive connections in the program matrix 104. It is to be understood, of course, that other programs involving successive transformations and variations in threshold and self connections could also be implemented by changing the crosspoint connections in the program matrix.

In the preceding discussion, two specific examples of translation from a given input pattern to a related output pattern have been given. In connection with the description of FIG. 2, certain picture pattern recognition operations were disclosed. In FIG. 4, successive transformations for noise reduction were considered. For the purposes of FIGS. 2 and 4, certain settings of the threshold level and of the direct or self connection were considered. In the following discussion of FIG. 5, all of the various threshold and direct connection settings available in the illustrative circuit of FIGS. 3A, 3B, and 3C will be considered.

In FIG. 5, the input patterns are presented in the first, or left-hand, set of four patterns. The output patterns derived from each input pattern are presented in the twelve fields shown in the second, third, and fourth columns. In the upper row of fields, the threshold level or Z control is set equal to 1. In the successive additional rows, the threshold is increased up to a level of 4 in the last row. The three output transformation patterns for each threshold value represent different self or direct connections. Thus, in the second column, which is the first column of transformation patterns, the self connection is set to the "adding" control. In the second and third columns of transformation patterns, the self control is at the "out" and the "subtracting" settings, respectively.

In considering the patterns set forth in FIG. 5, it may be recalled that each threshold-responsive element in the translation field is connected to five elements in the input field. Accordingly, with low settings of the threshold and with the direct connection in the adding position, it would be expected that the transformation patterns include more points than the original input patterns. Following the same reasoning, it would be expected that with higher threshold levels and with the self or direct connection set to the "subtract" control, that fewer points should appear in the output field than in the original input field. An examination of the patterns of FIG. 5 shows that these general trends do indeed obtain.

Figure 6:
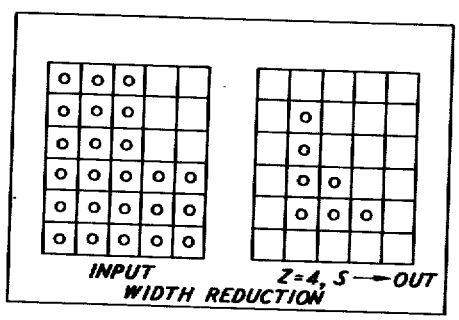
Figure 7:
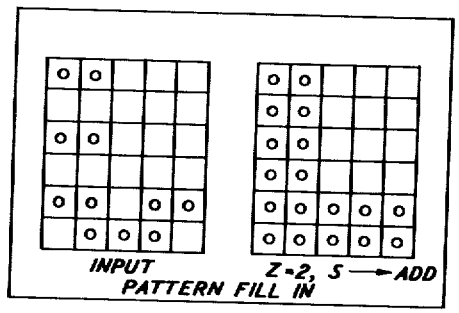
Figure 8:
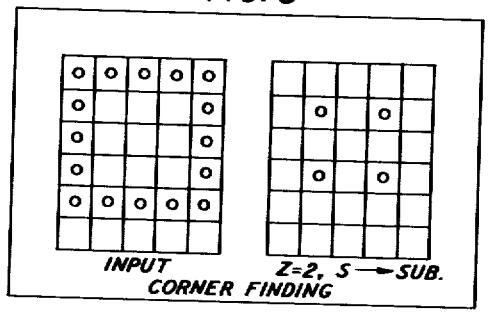

In FIGS. 6 through 11, various specific operations for performing picture processing operations will be considered. In FIG. 6, with a relatively high value of the threshold setting, the output patterns shows a width reduction as compared with the original input pattern. In FIG. 7, with the threshold setting at 2 and the self connection set to the "add" state, a pattern fill-in operation takes place. FIG. 8 shows a simple corner finding operation.

Figure 9:
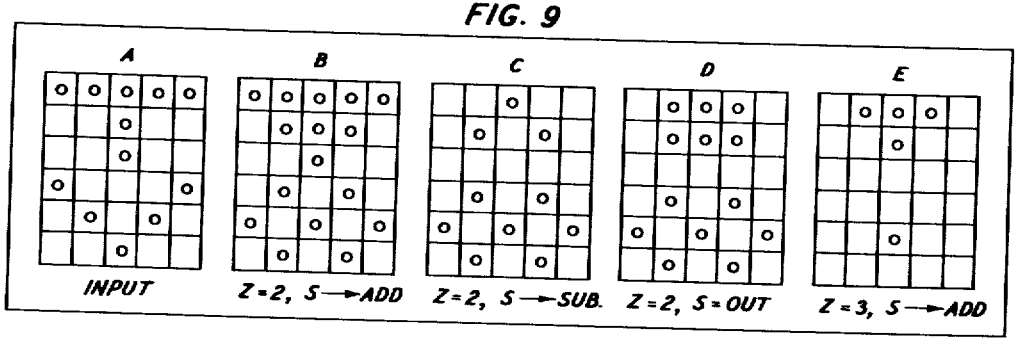

Pattern A in FIG. 9 is identical with the input pattern in FIG. 2. In patterns B, C, D, and E various output patterns with different control settings are shown. These control settings are steps in the determination of the appropriate picture processing operations for identifying particular letters or patterns.

Figure 10:
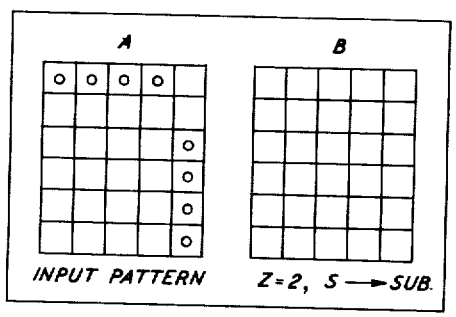
Figure 11:
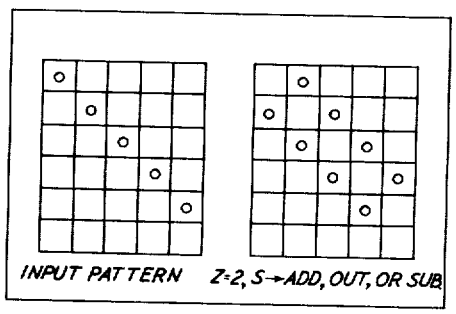

In FIG. 10, it is shown that a blank output field results from the input pattern A when the settings of the threshold level are at 2 and the direct connection is at inhibit or subtract. In FIG. 11, the same output pattern is produced with any setting of the direct or self connection when the threshold level is set equal to 2. From a consideration of the transformations shown in FIGS. 10 and 11, noting that a threshold level of 2 is employed in both cases, it is clear that vertical and horizontal lines may be distinguished from diagonal lines. Thus with reference to FIG. 3B of the drawings, neither of the two output relays 94 and 96 would be energized by pattern B of FIG. 10, while both relays would be energized by pattern B of FIG. 11.

The block diagram of FIG. 12 indicates in a general way the applicability of the principles of the present invention to pattern recognition problems. In FIG. 12, the input pattern to the storage circuit 130 is provided by the scanner 132. From the input pattern store the pattern transformation circuit 134 produces an output pattern which may be stored in circuit 136. The cycling gate 138 controls the application of fields from the output pattern store 136 to the input pattern store 130. Following a series of successive transformations, the output pattern store 136 may be tested by the output examination circuit 139, and a signal indicating features of the input pattern is supplied to the features store circuit 140. The successive features indicated by circuit 140 are translated to indicate the particular output numbers or letters, for example, which were provided by scanner 132. The output translator 142 performs this final function.

In the circuit of FIG. 12, the master control circuit 144 controls the transfer of signals from one circuit block to the next and prescribes the nature of required translations following each output signal to the features store 140. It may be noted that the circuit of FIG. 12 is in reality a more sophisticated version of the circuit of FIGS. 3A, 3B, and 3C. It principally involves the addition of the features store 140 and the translator 142. In addition, the circuit of FIG. 12 requires a more complex control circuit than that indicated in FIG. 3B. Such a more complex control circuit is required to select alternative programs following preliminary recognition of character or pattern features.

FIG. 13 is a simplified showing of a threshold-responsive element. As we have seen in the case of the circuit of FIG. 3A, the threshold-responsive element could be a transistor having a number of input signals which are summed to provide a triggering threshold potential. In FIG. 13, the threshold control is designated Z and the input leads are designated $X_{1j}$, $X_{2j}$ . . . $X_{nj}$.

In FIG. 14, the threshold-responsive element of FIG. 13 is provided with additional control and output circuits. Thus, for example, each input lead to the threshold-responsive element 148 is provided with a gate. In FIG. 14, these gates are designated 150, 152, and 154. One of the inputs to the gate 150 is the additive or subtractive control. These leads are designated $A_1$, $A_2$ . . . $A_n$ in FIG. 14. The leads from the input field are designated $B_{1j}$, $B_{2j}$ . . . $B_{nj}$ and control the gates. The signal from the threshold-responsive device 148 is stored in the output flip-flop 156. In FIG. 14 as in FIG. 13, the threshold level control lead is designated Z.

In FIG. 15, the block 158 represents the threshold-responsive element 148 itself, the input gates 150, 152, and 154, and the output register 156 of FIG. 14. Thus, when the threshold-responsive element included in component 158 in FIG. 15 once reaches the required threshold level for it to be enabled, the output signal $C_j$ is maintained until a reset signal R is applied to component 158.

FIG. 16 represents an alternative array of connections between an input field 160 and a transformation field including a number of threshold-responsive components such as 162. In the connection pattern shown in FIG. 16, the component 162 represents a translation component which corresponds to the input device 164 in the input field 160. The component 162 has a direct connection to the input device 164. In addition, it is connected to all elements in the input field which are on the same horizontal line with input device 164 and to all elements which are in the same vertical line. With this type of network connections to each of the threshold components in the translation array, picture processing operations which correspond generally to scanning sweeps may be performed. It is obvious, therefore, that a data processing apparatus having connections as shown in FIG. 16 has capabilities which are not present in the simpler connections shown in the circuit of FIGS. 3A and 3B, for example. It may also be noted that radial and circular connections could be provided for arrays following a polar coordinate plan.

Other variations on the connection and control pattern shown in FIG. 1 and described in detail in conjunction with FIGS. 3A, 3B, and 3C are also possible. For example, each module in the translation array could be connected to the eight or more nearest "neighbors" instead of merely to the four "neighbors." In addition, the weighting of the digital signals from adjoining input sources could be varied in the same manner or on an expanded scale as discussed above for the direct connections.

It is to be understood that the above-described arrangements are illustrative of the application of the principles of the invention. Numerous other arrangements may be devised by those skilled in the art without departing from the spirit and scope of the invention.

What is claimed is:

In combination in a spatially oriented data processing apparatus, a plurality of sources of input information signals arranged in a spatial array, a plurality of translation modules in one-to-one correspondence with said sources and arranged in a spatial array identical in configuration to that of said sources, each of said modules including an element which is only responsive to signals above a predetermined threshold level, control means for coupling input information signals from said sources to said translation modules in parallel, said control means comprising means connecting each source to its correspondingly-positioned module and to a plurality of additional modules associated with said correspondingly-positioned module, means for varying the threshold level of said translation modules, means for controlling the polarity of signals applied from each source to its correspondingly-positioned module to be additive or subtractive with respect to signals applied from other input sources to the correspondingly-positioned translation module, an array of output elements respectively responsive to the condition of said translation modules for indicating the states thereof, and means for applying signals representative of the indications of said output elements to the inputs of said array of translation modules for further selective modification of the signals representative of the indications of said output elements without affecting the condition of signals applied to said modules from said input sources.

(References on following page)

References Cited in the file of this patent

UNITED STATES PATENTS

| | | | |
|---|---|---|---|
| 2,482,242 | Brustman | Sept. 20, | 1949 |
| 2,638,402 | Lee | May 12, | 1953 |
| 2,662,126 | Henson | Dec. 8, | 1953 |
| 2,680,228 | Smith | June 1, | 1954 |
| 2,734,184 | Rajchman | Feb. 7, | 1956 |
| 2,815,488 | Von Neumann | Dec. 3, | 1957 |
| 2,842,756 | Johnson | July 8, | 1958 |
| 2,844,812 | Auerbach | July 22, | 1958 |
| 2,851,661 | Buland | Sept. 9, | 1958 |
| 2,881,976 | Greanias | Apr. 14, | 1959 |
| 2,889,540 | Baur et al. | June 2, | 1959 |
| 2,916,724 | Peterson | Dec. 8, | 1959 |
| 2,928,008 | Takahasi et al. | Mar. 8, | 1960 |
| 2,934,741 | Gray et al. | Apr. 26, | 1960 |
| 2,948,818 | Goto | Aug. 9, | 1960 |
| 2,948,819 | Goto | Aug. 9, | 1960 |

OTHER REFERENCES

Proceedings Ass. for Comp. Mach., May 1952, pp. 223–229, by Saunders.

Transactions of the I.R.E., PGIT–4, September 1954, pp. 76–84 (by R. Farley et al.).

Arithmetic Operations in Digital Computers, by R. Richards, Van Nostrand Co., 1955, pp. 128–132.